Sept. 18, 1934. J. H. SCHAIBLE 1,974,367
PLANT AND VINE TRAINING DEVICE
Filed May 25, 1933
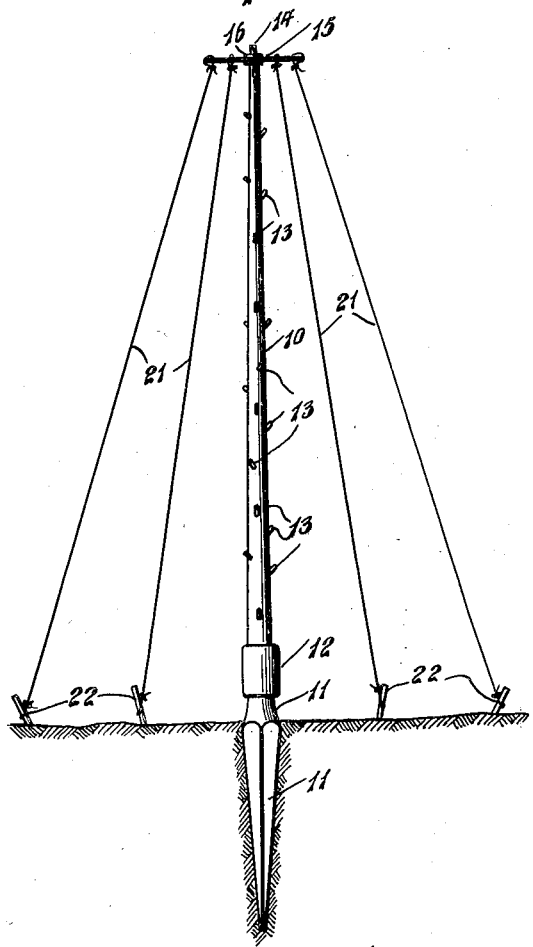
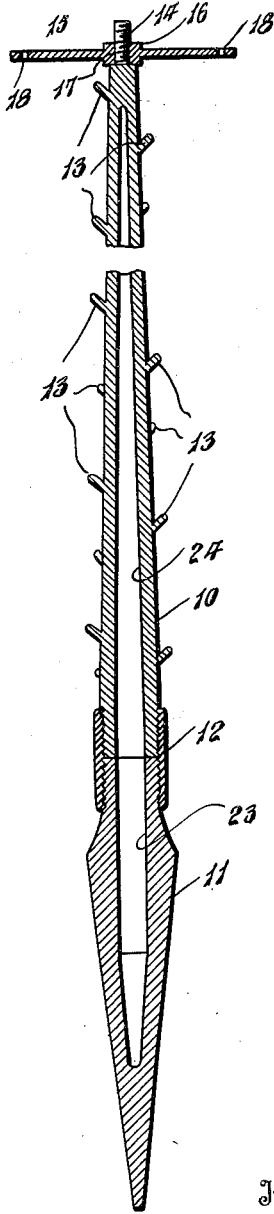
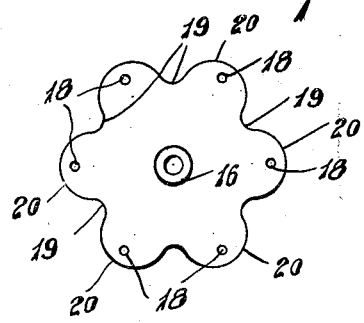
Inventor
J. H. Schaible.

UNITED STATES PATENT OFFICE 1,974,367

PLANT AND VINE TRAINING DEVICE

John H. Schaible, Catonsville, Md.

Application May 25, 1933, Serial No. 672,877

1 Claim. (Cl. 47—44)

The invention relates to means for training plants and vines, and particularly to improved means over my prior patent issued March 7, 1916, numbered 1,174,901, entitled Bean pole, and has for its principal object the provision of improvements to the bean pole of the patent referred to consisting in providing the upper free end of the pole with a reduced and threaded extremity on which is threadedly mounted a substantially circular disk provided with openings adjacent to its margin and spaced around the margin of the disk to provide means whereby wires, cords, and other flexible elements may be secured and to be used in connection with the pole for supporting plants and vines.

The invention will be described in detail hereinafter and will be found illustrated in the accompanying drawing, in which Figure 1 is a view in elevation of the pole showing it adapted for supporting flexible members, Figure 2 is a longitudinal sectional view of the pole and disk, and Figure 3 is a plan view of the disk.

In the drawing similar reference characters are used to designate corresponding parts in all of the views.

The pole 10 and the anchoring means 11 that is secured to the pole 10 by means of a threaded coupling member 12, and including the upwardly and outwardly directed projections or spines 13 are substantially identical with the bean pole disclosed in Patent No. 1,174,901, except that the upper extremity of the pole 10 is provided with a reduced and threaded extension 14 on which is mounted a disk 15, having a central boss 16 provided with a threaded opening 17 to engage the threads on the extension 14.

Disk 15 is provided with a plurality of spaced openings 18 adjacent to its outer margin or edge, and the disk may be provided with recesses 19 between the openings 18, the disk intermediate of said margin being preferably curved as shown at 20.

The openings 18 in the disk 15 are provided to receive wires, cords, or other flexible members 21 that may be secured in any suitable manner in the ground or adjacent thereto, one means of securing the free ends of said members 21 being illustrated in Figure 1, the means comprising pegs 22 driven into the ground to which the free ends of said members 21 are secured.

By having the pole 10 and the anchoring member 11 separable and securable together by means of the threaded coupling 12, it will be apparent that the pole may be easily installed by first driving the anchoring member 11 into the ground and then securing the pole 10 thereto by means of the coupling member, and for convenience in driving the anchoring member 11 into the ground without injuring the upper edge of the anchoring member, the anchoring member is provided with an opening 23 that may be utilized to receive a stick of wood or other material on which a sledge-hammer or other driving means may be used. The opening 23 also provides for saving material in constructing the anchoring member and to make it lighter, and the pole 10 is also provided hollow as shown at 24 to render it lighter and to save material in its construction.

While my pole 10 and anchoring member 11 connected by means of the coupling 12 is primarily provided for training vines and plants, it will be apparent that the pole may be used for other purposes, such for instance as a fence post, the spines 13 being adapted to support wires or other connecting means between the posts.

What is claimed is:—

A vine trainer pole, comprising a pole having a reduced and threaded upper extremity, and a disk having a threaded opening mounted on said threaded extremity, said disk provided with spaced marginal openings adapted to receive flexible elements.

JOHN H. SCHAIBLE.